Feb. 12, 1952     O. B. JOHNSON     2,585,782
POP-UP SPRINKLER DEVICE
Filed Sept. 28, 1948
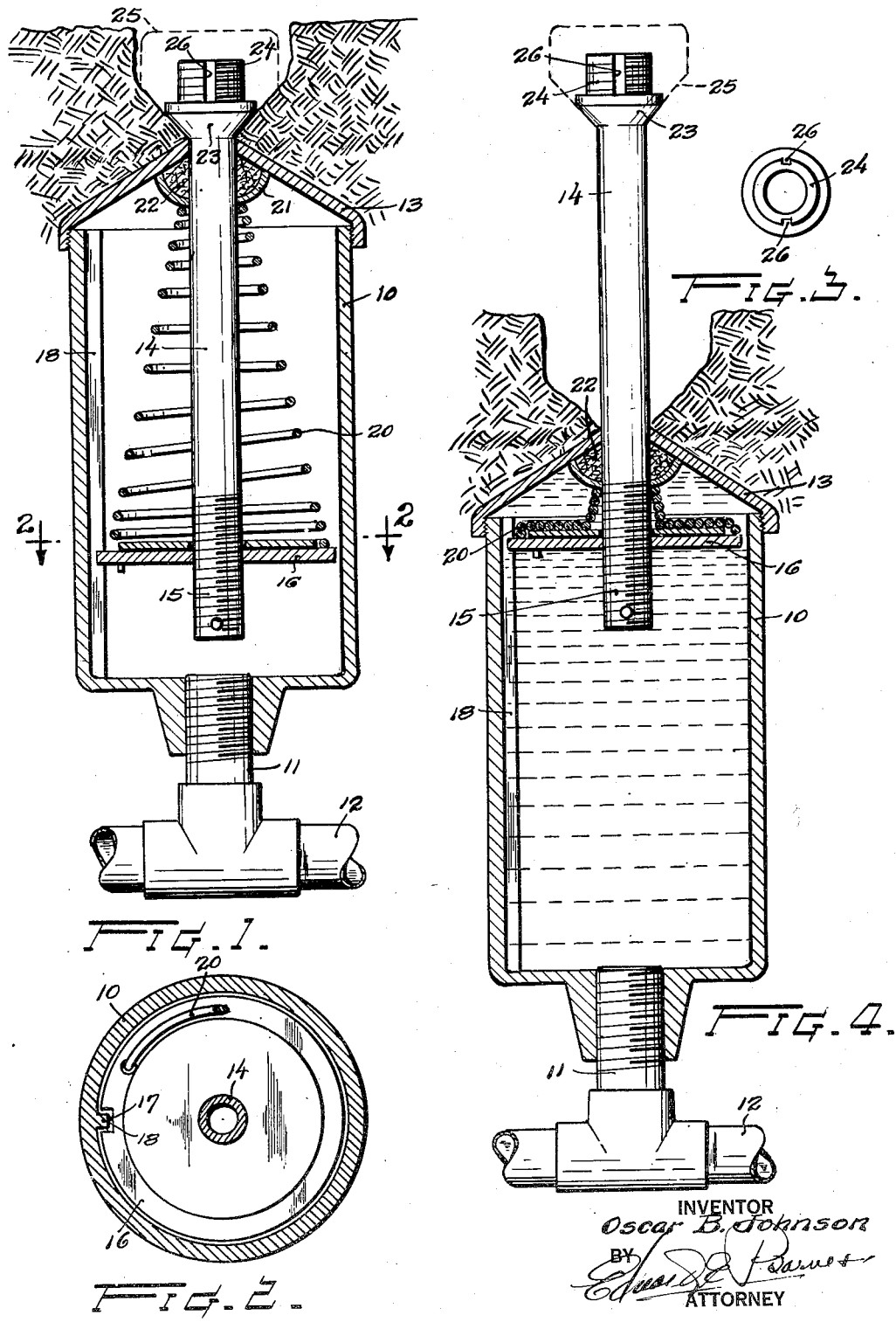
INVENTOR
Oscar B. Johnson
BY
ATTORNEY Patented Feb. 12, 1952

2,585,782

UNITED STATES PATENT OFFICE 2,585,782

POP-UP SPRINKLER DEVICE

Oscar B. Johnson, Kent, Wash.

Application September 28, 1948, Serial No. 51,600

5 Claims. (Cl. 299—61)

This invention relates to a lawn sprinkler of the character commonly known as a "pop-up" sprinkler and this is to say one which normally occupies a position recessed below the surface of a lawn by pressure of water delivered to the sprinkler is caused to rise and protrude by its discharge end above the ground surface.

In lawn sprinkling of the above character, there is usually provided a cylindrical casing which connects by its lower end with the water supply line, and received within the casing and made subject to the pressure of the supplied water is a piston carrying a hollow stem which is journaled for vertical sliding movement through the head wall of the casing, the upper end of the stem having a sprinkler head mounted thereon. There are two general types of "pop-up" sprinkler, one of which is gravity-closing and relies simply upon the combined weight of the head, stem, and piston to cause the head to drop into an inactive recessed position when the piston is relieved of the pressure of the pressure-water supply, and the other of which is intended to assure positive retraction and introduces a spring working in opposition to the pressure of the supplied water. The first said type has met with little favor due to the fact that (1) considerable leakage takes place around the stem due to the practical necessity of providing a sloppy fit where the stem passes through the head wall of the casing, and (2) the stems commonly hang up after a short period of usage and must be pressed downwardly by foot pressure, the causative factor being the root development of the grass which creeps inwardly and develops a choking growth around the stem. The principal objection to the spring type of "pop-up" sprinklers, as heretofore devised, is that the employed spring, where given sufficient strength to accomplish its intended purpose of positively retracting the stem, occupies a very considerable space when the coils are brought into contiguity under compression, hence either shortens the stroke and consequently limits the degree to which the stem will project or, in the alternative, necessitates that the casing be given undue length and which perforce requires that the water-supply pipes be placed deeper in the ground than would otherwise be the case. Previous to the present invention, "pop-up" sprinklers of the spring-retracted type have, moreover, been commonly troubled by much the same condition which has caused gravity-closing stems to hang up, namely growth of grass around the top end of the casing. Failing frequent attention on the part of the individual who is tending the lawn to cut the root growth from around the sprinkler, the grass becomes compacted under the bottom shoulder of the retracting sprinkler head and the head consequently remains slightly exposed above the ground surface.

The present invention is of the spring-closing type and has two principal objects. One is to provide a "pop-up" sprinkler characterized in that the employed spring is of the volute type whereby to enable the coils, when compressed, to nest one within another and occupy a minimum amount of space lengthwise of the axis, consequently to permit the "pop-up" stem to rise a distance very nearly approximating the over-all length of the stem. The other object is to devise a "pop-up" sprinkler the design of which inherently acts to preclude grass and root growth from packing itself between the bottom shoulder of the sprinkler head and the top wall of the casing.

In addition to these principal objects, the invention aims to provide a spring-closing type of "pop-up" sprinkler having a minimum number of parts, which is simple in construction, which admits of being easily and quickly adjusted for regulation of spring pressure, which is substantially proof against becoming fouled in the event of occasional pebbles being delivered through the water-supply line into the casing of the sprinkler, which assures an effective seal against escape of water past the slide journal in which the stem works, and which assures long and trouble-free service and yet admits of being quickly and easily dismantled for purposes of inspection or repair should the need therefor arise.

The invention consists in the novel construction and in the adaptation and combination of parts hereinafter described and claimed.

In the accompanying drawing:

Figure 1 is a vertical sectional view portraying a "pop-up" sprinkler constructed in accordance with the now-preferred embodiment of the present invention, and with the "pop-up" stem shown in its normal retracted position, dotted lines being employed to show the outline of a sprinkler head.

Fig. 2 is a horizontal sectional view on line 2—2 of Fig. 1.

Fig. 3 is a detail top plan view showing the head end of the stem; and

Fig. 4 is a view similar to Fig. 1 excepting that the stem is here illustrated as having been raised to an operating position by pressure of incoming water.

Referring to said drawings, the numeral 10 designates a cylindrical open-top casting, desirably composed of brass, which serves as the casing for my sprinkler device. Made to a somewhat larger diameter than the housings previously used, said casing is bossed at the bottom and has an inlet opening therethrough threaded for the reception of a nipple 11 leading from a water-supply pipe 12. The upper end of the casing is open and removably threaded thereon is a centrally apertured cover plate 13 formed to a substantial cone shape. Denoted 14, the hollow "pop-up" stem of the present invention is received through the aperture of this cover plate, and has its lower end externally threaded as at 15 for engagement with the internal threads of a circular plate 16. Serving as the piston element of the present assembly, said plate has a diameter somewhat smaller than the chamber of the casing and provides in its perimeter a notch 17 finding a free-fitting engagement over a vertical rib 18 integrated with the wall of the casing. A compression spring 20 of the volute type, and expressly one which permits successive coils of progressively smaller diameter to nest within the next larger coil, is received within the casing and is caused to bear by its bottom end against the piston and by its top end against a cup-like gland 21 surrounding the stem and containing packing material 22, the packing filling the V-angle described between the external wall of the stem and the sloping bottom wall of the cover plate.

Reverting to the stem, there is provided at the head end thereof a prominence, and it will be seen that this prominence is given a substantial mushroom shape to have the shoulder 23 formed upon the underside flare outwardly in a direction counter to the external slope of the cover plate 13. The prominence may itself be of such construction as to constitute the sprinkling nozzle of the device, but I find it preferable to provide the stem with an adapter neck 24 which admits of being threaded into the socket of any one of a number of suitable sprinkler heads used to diffuse the water supplied thereto and which are presently available upon the market, such head being shown by dotted lines and being designated 25. The adapter neck is formed as a reduced axial prolongation of the stem's head prominence, and is or may be provided with slots 26 at diametrically opposite sides to accommodate a matching key for turning the stem, such turning movement perforce shifting the piston in a direction axially of the stem and thus serving as an adjustment for regulating the tension of the volute compression spring 20.

The operation of the device will, it is thought, be well understood, pressure water entering the chamber of the casing from the supply pipe 12 forcing the piston and stem upwardly against the resistance of the spring 20 into the operating position shown in Fig. 2. As pressure is relieved by closing the control valve which governs the flow of water through said pipe, the compressed spring forces the piston downwardly and retracts the stem into the normal inoperative position shown in Fig. 1, the piston being permitted in its said operating movement to travel to very nearly the extreme upper limit of the casing in consequence of the ability of the spring coils to nest one within another as the same are compressed. The spring shown is one which intentionally precludes a nesting of the last few coils and thereby acts as a stop serving two important ends, one that of preventing the piston from rising to a degree whereat the notch 17 will become disengaged from the slide rib 18 and (2) that of preventing the threaded portion of the stem from passing the gland and cutting out the packing. In lieu thereof, it is of course feasible to apply to the stem a nut of little larger diameter than the stem and jam the same at the head end of the threads, this nut then serving as a stop by its engagement with the gland.

When the stem is brought downwardly by spring pressure, it is to be particularly noted that the flared underside of the stem's head-prominence acts in conjunction with the cone shape of the cover plate to produce a substantial V-throat surrounding the stem. The soil which overlies the cover plate becomes quite soggy after a sprinkling operation, and the expanding nature of the V-throat causes grass and root growth to be pushed outwardly away from the descending sprinkler head.

A feature of not inconsequential importance in the present sprinkler device is that the casing provides a rather large chamber below the piston and in the event of pebbles carried with the incoming water into the casing the same will ordinarily be deposited upon the floor of the casing and will rarely rise through the stem to clog the sprinkler orifices of the sprinkler head. These pebbles almost invariably enter the system when the pipes are being laid and while it is the usual practice to "blow" the system before installing the sprinkler heads many of the pebbles will hang up at the pipe bends and may not pass through the pipes into the casing until the system has been used several times.

The invention admits of some departures from the preferred embodiment illustrated and described, and it is accordingly my intention that no limitations be implied and that the hereto annexed claims be given a scope fully commensurate with the broadest interpretation which the employed language fairly permits.

What I claim is:

1. A "pop-up" lawn sprinkler comprising a closed casing adapted to be connected with a pressure source of water supply, a hollow stem open at both ends for emitting water therethrough guidably supported for reciprocal vertical movement through the head wall of said casing, a piston element sustained upon the lower end of said stem, a packing gland sleeved upon the stem and seating freely against the underside of the casing's head wall, and a compression spring bearing by one end against the piston and by the other end against the gland to hold the gland in position and to yieldingly oppose the pressure of the supplied water and normally hold the stem in retracted position, said packing gland comprising a cup-like box containing the packing and by force of the spring pressure held in position with the rim of said cup-like box bearing upon the head wall.

2. A "pop-up" lawn sprinkler comprising a cylindrical casing adapted to be connected with a pressure source of water supply and closed at the top by a centrally apertured head wall, said casing being provided on its inner wall with a vertical guide rib, a hollow stem open at both ends for emitting water therethrough and guidably supported for reciprocal vertical movement through the head wall of said casing and having its lower end externally threaded, a piston member working on the threads of the stem and formed with a peripheral notch finding a slide fit with the guide rib and by the latter held against rotary movement, and a compression spring of the volute type exerting thrust from the head wall to the piston to work counter to the pressure of the supplied water and normally holding the stem in retracted position, the act of turning said stem operating in conjunction with the piston's non-rotary mounting to cause the piston to be shifted in a direction axially of the stem and by such shifting movement regulating the tension of the compression spring.

3. The lawn sprinkler of claim 2 in which the head end of the stem presents an adapter neck threaded for engagement in the mating socket of a removable sprinkler head, and wherein said threaded neck is externally slotted to accommodate the application of a conforming tool for imparting spring-regulating turning movements to the stem.

4. A "pop-up" lawn sprinkler comprising a cylindrical casing adapted to be connected with a pressure source of water supply and closed at the top by a centrally apertured conical head wall, a hollow stem for emitting water therethrough and guidably supported for reciprocal vertical movement through the aperture of said head wall and provided at the head end with a mushroom-shaped prominence presenting an upwardly flared conical underside merging with the outside surface of the stem, a piston element sustained upon the lower end of said stem, and spring means acting in opposition to the pressure of the supplied water for normally holding the stem in retracted position whereat said prominence abuts the head wall, said conical underside of the prominence and said conical head wall of the casing acting in conjunction as the stem descends into its said retracted position to produce a substantial V-throat surrounding the hollow stem and causing grass and root growth to be pushed outwardly.

5. A "pop-up" lawn sprinkler comprising a cylindrical casing adapted to be connected with a pressure source of water supply and closed at the top by a centrally apertured conical head wall, a hollow stem for emitting water therethrough and guidably supported for reciprocal vertical movement through the aperture of said head wall and provided at the head end with a mushroom-shaped prominence presenting an upwardly flared conical underside merging with the outside surface of the stem, a piston element sustained upon the lower end of said stem, and a compression spring of the volute type acting in opposition to the pressure of the supplied water for normally holding the stem in retracted position whereat said prominence abuts the head wall, said conical underside of the prominence and said conical head wall of the casing acting in conjunction as the stem descends into its said retracted position to produce a substantial V-throat surrounding the hollow stem and causing grass and root growth to be pushed outwardly.

OSCAR B. JOHNSON.

REFERENCES CITED

The following references are of record in the file of this patent:

UNITED STATES PATENTS

| Number | Name | Date |
| --- | --- | --- |
| 1,152,225 | Ryan | Aug. 31, 1915 |
| 1,612,135 | Lorraine | Dec. 28, 1926 |
| 1,751,723 | Borgeson | Mar. 25, 1930 |
| 1,790,358 | Tyrrell | Jan. 27, 1931 |
| 1,853,805 | Elder | Apr. 12, 1932 |
| 1,920,874 | Meloon | Aug. 1, 1933 |
| 2,128,552 | Rader et al. | Aug. 30, 1938 |
| 2,134,382 | Thompson | Oct. 25, 1938 |
| 2,399,112 | Glover | Apr. 23, 1946 |
| 2,496,489 | Palm | Feb. 7, 1950 |